US007660997B2

(12) United States Patent
Doyle

(10) Patent No.: US 7,660,997 B2
(45) **Date of Patent: *Feb. 9, 2010**

(54) USING BIOMETRICS ON PERVASIVE DEVICES FOR MOBILE IDENTIFICATION

(75) Inventor: Ronald P. Doyle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 12/046,131

(22) Filed: Mar. 11, 2008

(65) Prior Publication Data

US 2008/0212848 A1 Sep. 4, 2008

Related U.S. Application Data

(63) Continuation of application No. 09/537,068, filed on Mar. 28, 2000, now Pat. No. 7,412,604.

(51) Int. Cl.
*H04L 29/00* (2006.01)

(52) U.S. Cl. .................................................... 713/186

(58) Field of Classification Search ................. 713/168
See application file for complete search history.

(56) References Cited

U.S. PATENT DOCUMENTS

| | | | | |
|---|---|---|---|---|
| 6,016,476 | A * | 1/2000 | Maes et al. | 705/1 |
| 6,510,236 | B1 * | 1/2003 | Crane et al. | 382/116 |

* cited by examiner

*Primary Examiner*—Andrew L Nalven
(74) *Attorney, Agent, or Firm*—Marcia L. Doubet

(57) ABSTRACT

A method, system, and computer program product for using biometrics on pervasive devices for purposes of mobile identification. A biometric device of the prior art is attached to, or incorporated within, a pervasive device. This augmented pervasive device may then be used for capturing biometric information from an arbitrary third party in an arbitrary location. The captured information is analyzed to determine the third party's identification, access rights, etc. as needed by a particular application. This solution capitalizes on the portability and functionality of the pervasive device, as well as its built-in communication capability, to provide an extremely flexible, powerful biometric identification technique at relatively low cost.

10 Claims, 3 Drawing Sheets

USING BIOMETRICS ON PERVASIVE DEVICES FOR MOBILE IDENTIFICATION

CROSS-REFERENCE TO RELATED APPLICATION

The present application is a Continuation of commonly-assigned and U.S. patent application Ser. No. 09/537,068, filed on Mar. 28, 2000 now U.S. Pat. No. 7,412,604, which is hereby incorporated herein by reference.

BACKGROUND OF THE INVENTION

1. Field of the Invention

The present invention relates to a computer system, and deals more particularly with a method, system, and computer program product for using biometrics on pervasive devices for purposes of mobile identification.

2. Description of the Related Art

Pervasive devices, sometimes referred to as pervasive computing devices, are becoming increasingly popular, and their functionality (in terms of communication and processing capabilities) is increasing rapidly as well. Pervasive devices are often quite different from the devices an end-user might use in an office setting, such as a desktop computer. Typically, a pervasive device is small, lightweight, and may have a relatively limited amount of storage. Example devices include: cellular phones which are enabled for communicating with the Internet or World Wide Web ("Web"); wearable computing devices; devices mounted in a vehicle, such as an on-board navigation system; computing devices adapted to use in the home, such as an intelligent sensor built into a kitchen appliance; mobile computers; programmable digital assistants, or "PDAs"; handheld computers such as the PalmPilot from 3Com Corporation and the WorkPad from the International Business Machines Corporations ("IBM"); etc. ("WorkPad" is a registered trademark of IBM.)

Many pervasive devices are designed for portable use, and therefore are often adapted for connecting to a network. Because of their portability, these smaller devices typically enable the user to perform computing functions regardless of where he or she happens to be at the time, and some allow a user to easily transport the device as the user moves about in his or her daily activities. While early examples of these devices were somewhat expensive to operate, requiring a relatively expensive wireless network connection with limited bandwidth, the processing speeds of these devices are becoming faster and network bandwidth is growing quickly. As these smaller, more portable types of computing devices become more affordable and more popular among consumers, the demand for consumer access to data will continue to grow by leaps and bounds. This demand will drive new innovation that will lead to further increases in processing speeds and increased network bandwidth, making use of such devices more affordable and more widely accepted. As this trend continues, the idea of transmitting larger and larger amounts of data via the pervasive device will not be considered a barrier to its use. Furthermore, valuable new ways of exploiting these devices will be discovered. One field which has not yet been adapted to use by pervasive devices is biometrics.

Biometrics is the field of statistically analyzing biological data. Biometric techniques in common use today include retinal scanning, fingerprint and palm print analysis, and voice print analysis. Biometric devices with which biometric information can be captured and processed are increasingly being used to enable identifying the owner of a resource, and/or for controlling access to a resource. Typically, the resources are stationary or somewhat fixed in physical location. Example scenarios where biometrics are commonly used include: controlling access to bank accounts through automated teller machines; controlling access to personal computers; and for identification with residential and commercial security systems.

U.S. Pat. No. 5,915,973, entitled "System for Administration of Remotely-Proctored, Secure Examinations and Methods Therefor", issued to Hoehn-Saric et al. and referred to hereinafter as the '973 patent, discloses a technique for using biometric data to protect access to a stationary testing site where a person is to be tested on some arbitrary topic. Biometric information about the test taker is used to create a registration card that is subsequently used to identify properly registered test takers. Biometric information is used again to enable delivery of test data (e.g. questions to be answered) to a test taker from a remote storage location, or to unlock the device on which the test data resides locally.

U.S. Pat. No. 5,222,152, entitled "Portable Fingerprint Scanning Apparatus for Identification Verification", issued to Fishbine et al. and referred to hereinafter as the '152 patent, discloses a scanning device which scans and records fingerprint images and then transmits the images to a separate mobile unit for digitizing. The fingerprint information is subsequently transmitted from the mobile unit to a base unit at a central location for determining the identity of the person being fingerprinted and for performing a background check on that person. U.S. Pat. No. 5,467,403 (referred to hereinafter as the '403 patent), which is also entitled "Portable Fingerprint Scanning Apparatus for Identification Verification" and issued to Fishbine et al. as a continuation-in-part of U.S. Pat. No. 5,222,152, further discloses a highly-integrated camera for capturing a photographic image of the person being fingerprinted. The portable image collection device is designed as a plug-in to a separate charger/cradle device (referred to as the "base unit") which is preferably mounted in a police patrol car. The collected information is transferred from the portable device to the separate base unit, and is then sent from the base unit to the police station for comparison purposes. Addition of a "small scale QWERTY keyboard (as in a notebook computer)" to the portable device is referenced in regard to controlling operation of the device, directing it to toggle between fingerprint and mug shot mode; capture an image; display a menu of functions; and select a displayed function. Addition of nonvolatile memory to the portable device is described as an alternative embodiment where images are stored with the portable device for later transmission to the base unit, rather than requiring a tether or wireless transmitter for that purpose (as in the preferred embodiment).

However, none of these references teaches use of biometrics with pervasive devices. The '973 patent is for use in a fixed, stationary application (the testing site). The '152 and '403 patents use a portable device for capturing fingerprint data and photographic images, but require this portable device to transmit information to another device (referred to therein as a mobile unit and a base unit, respectively), where that second device transmits the information to a central processing location.

Accordingly, what is needed is a solution that capitalizes on the portability and functionality, as well as the built-in communication capability, of pervasive devices to provide an improved technique for performing biometric analysis.

BRIEF SUMMARY OF THE INVENTION

An object of the present invention is to provide an improved technique for use of biometric information as identification.

Another object of the present invention is to provide this technique in a manner whereby an augmented pervasive device is used to capture biometric information.

Another object of the present invention is to provide this technique such that the pervasive device sends the captured biometric information to a central site for analysis.

Yet another object of the present invention is to capitalize on the portability and functionality, as well as the built-in communication capability, of pervasive devices to provide an improved technique for performing biometric analysis.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for using biometrics on pervasive devices for mobile identification. This technique comprises: capturing biometric data of a third party using a biometric input reader attached to or incorporated within a mobile pervasive device; and identifying the third party using the captured biometric data by comparing the captured biometric data to previously-stored biometric data.

This technique may further comprise: transmitting the captured biometric data from the mobile pervasive device to a remote server; retrieving, by the remote server, information from a repository using the transmitted biometric data; and returning the retrieved information to the mobile pervasive device. The retrieved information may comprise a photograph of a party to whom the biometric data corresponds. Or, the retrieved information may comprise access rights of a party to whom the biometric data corresponds, protected information not locally accessible to the mobile pervasive device, or some other type of information.

The technique may also comprise filtering, by the remote server, the retrieved information based upon a determined identity of the third party, in which case the returned retrieved information is the filtered retrieved information.

The mobile pervasive device may further comprise a locally-stored repository containing the previously-stored biometric data, and wherein the identification compares, by the mobile pervasive device, the captured biometric data to the previously-stored biometric data in the locally-stored repository.

In one aspect, this technique may be used to enable on-demand creation of a secure meeting site by repeating operation of the capturing and the identifying for each of a plurality of meeting attendees. In another aspect, this technique may be used to exchange a trusted message by performing operation of the capturing and the identifying wherein the third party is a potential recipient of the trusted message.

The present invention will now be described with reference to the following drawings, in which like reference numbers denote the same element throughout.

DETAILED DESCRIPTION OF THE INVENTION

Figure 1:
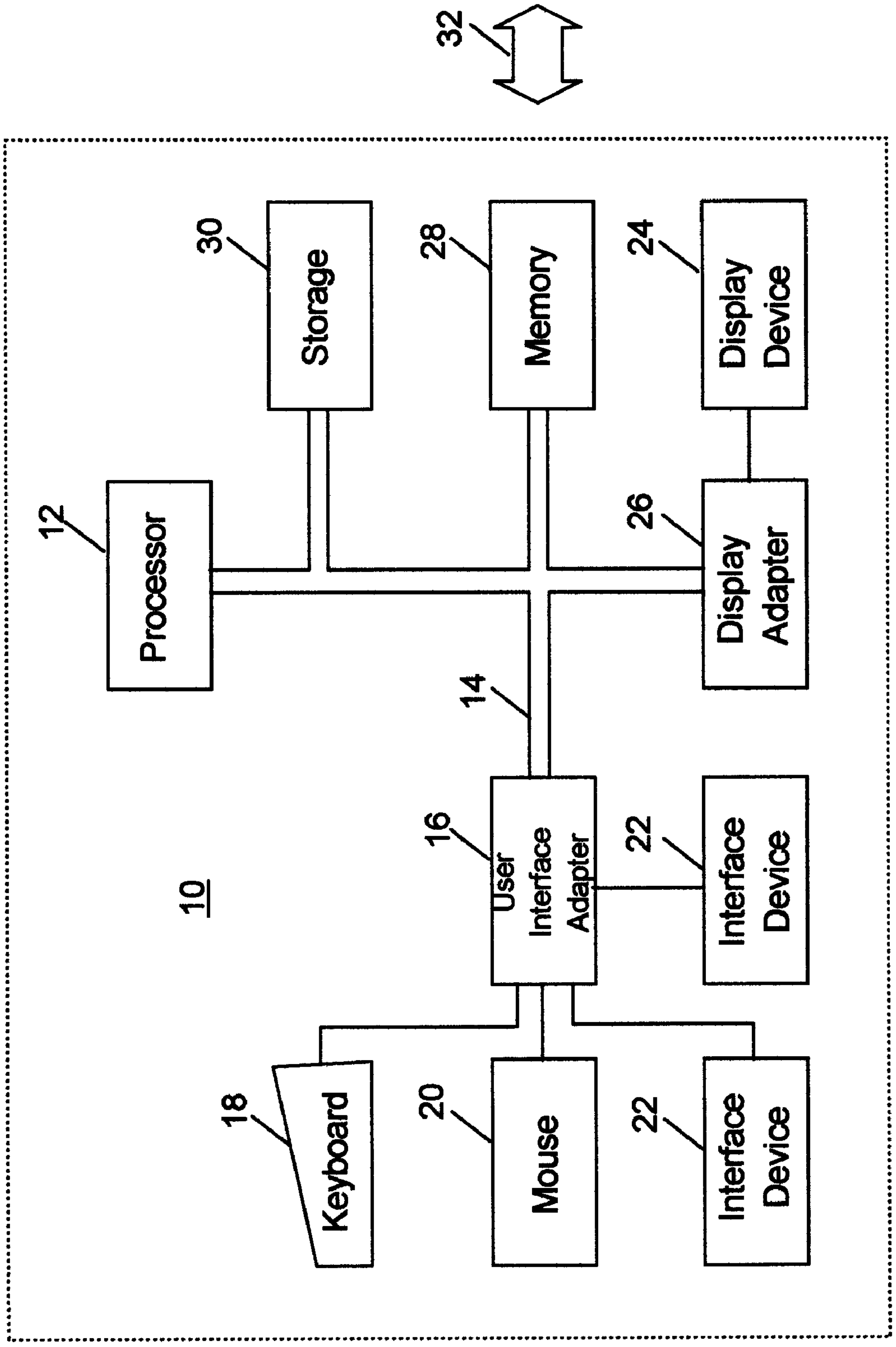
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, which for purposes of the present invention is a pervasive device such as a handheld computer, laptop computer, cellular phone, screen phone, etc., including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, such as a user interface device (which may be a touch sensitive screen, digitized entry pad, etc.). The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, preferably using a wireless interface at 32, such as a CDPD (cellular digital packet data) card. The workstation 10 may be associated with such other computers in a LAN or a WAN, or the workstation 10 can be a client in a client/server arrangement with another computer, etc. All of these configurations, as well as the appropriate communications hardware and software, are known in the art.

Figure 2:
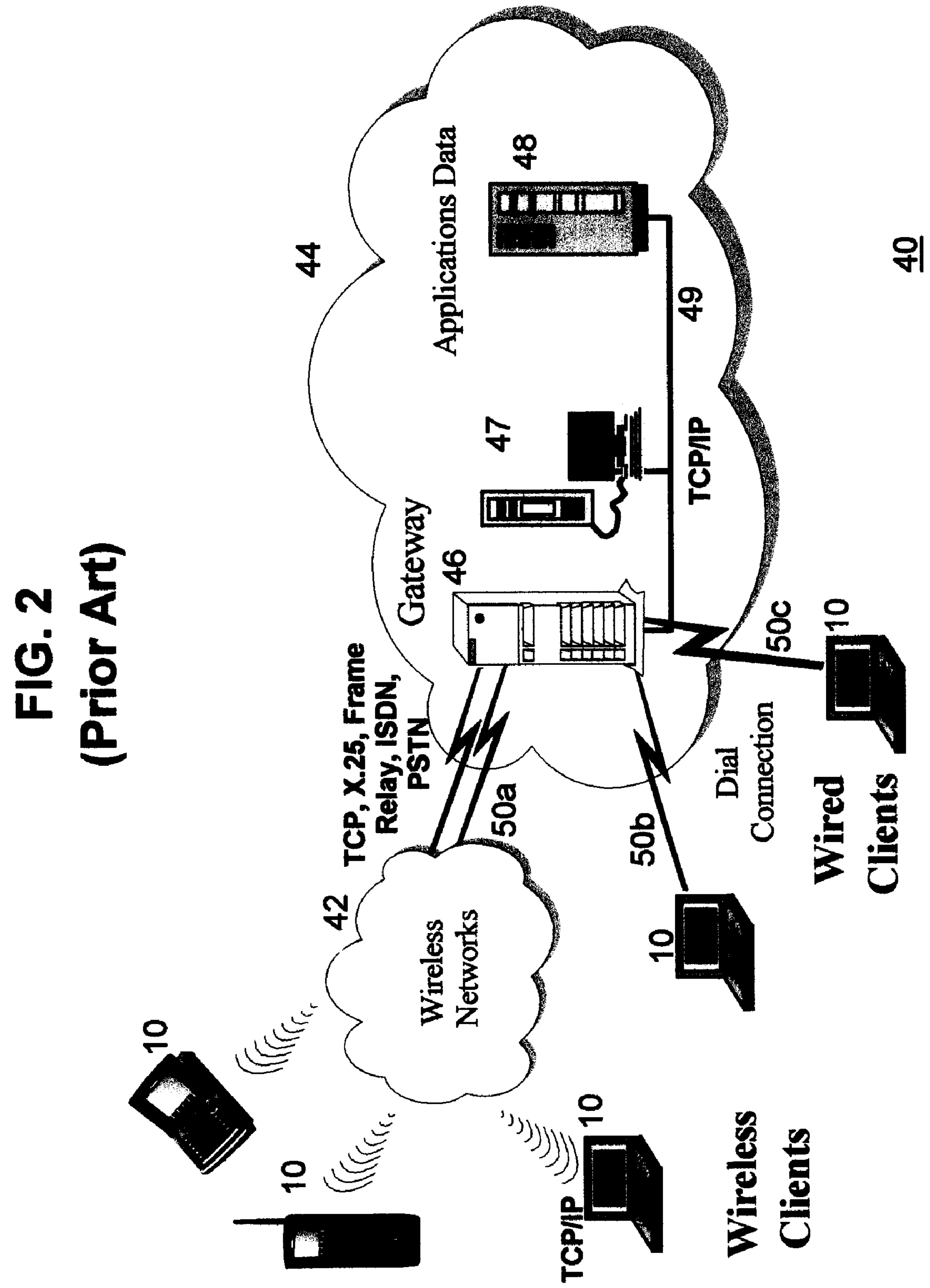
FIG. 2 (Prior Art)
FIG. 2 is a diagram of a networked computing environment in which the present invention may be practiced.

FIG. 2 illustrates a network computing environment 40 in which the present invention may be practiced. The network computing environment 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50*a*. The gateway 46 may also be directly coupled to one or more workstations 10 using a communications link 50*b*, 50*c*. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50*a* such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50*b* or 50*c*. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 (and/or server 47 or gateway 46) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

In the preferred embodiment, a user of the present invention preferably connects his or her pervasive device to a server using a wireless connection. Wireless connections use media such as satellite links, radio frequency waves, and infrared waves. Many connection techniques can be used with these various media, such as using a cellular modem to establish a wireless connection, etc. The user's device may be any type of pervasive device having processing and communication capabilities. The remote server can be one of any number of different types of computer which have processing and communication capabilities. These techniques are well known in the art, and the hardware devices and software which enable their use are readily available. The computing environment in which the present invention may be used includes an Internet environment, an intranet environment, an extranet environment, or any other type of networking environment. These environments may be structured using a client-server architecture, a multi-tiered architecture, or an alternative network architecture. (In an alternative embodiment, described below, communication capabilities are not required, nor is a wireless connection to a remote server.)

The present invention discloses a technique for using biometrics on pervasive devices to enable mobile identification. A biometric device, many of which are commercially available, is attached to (or may be incorporated within) the pervasive device for the purpose of recording "third-party" identification (that is, the biometric data of another being encountered by the possessor of the pervasive device). (This is to be distinguished from use of biometrics to allow access to the pervasive device itself, which is known in the art.) In the preferred embodiment, the third-party recorded identity information is then transmitted from this augmented pervasive device to a server (such as server 47 of FIG. 2) which is capable of doing a search through a data repository to gather all information associated with this biometric identity. In this manner, the biometric information may be used to validate the identity of an arbitrary third party, determine the third party's access privileges, or perform other identity-sensitive processing as required by a particular application of the present invention.

The preferred embodiment of the logic with which the present invention may be implemented will now be discussed in more detail with reference to FIG. 3.

Figure 3:
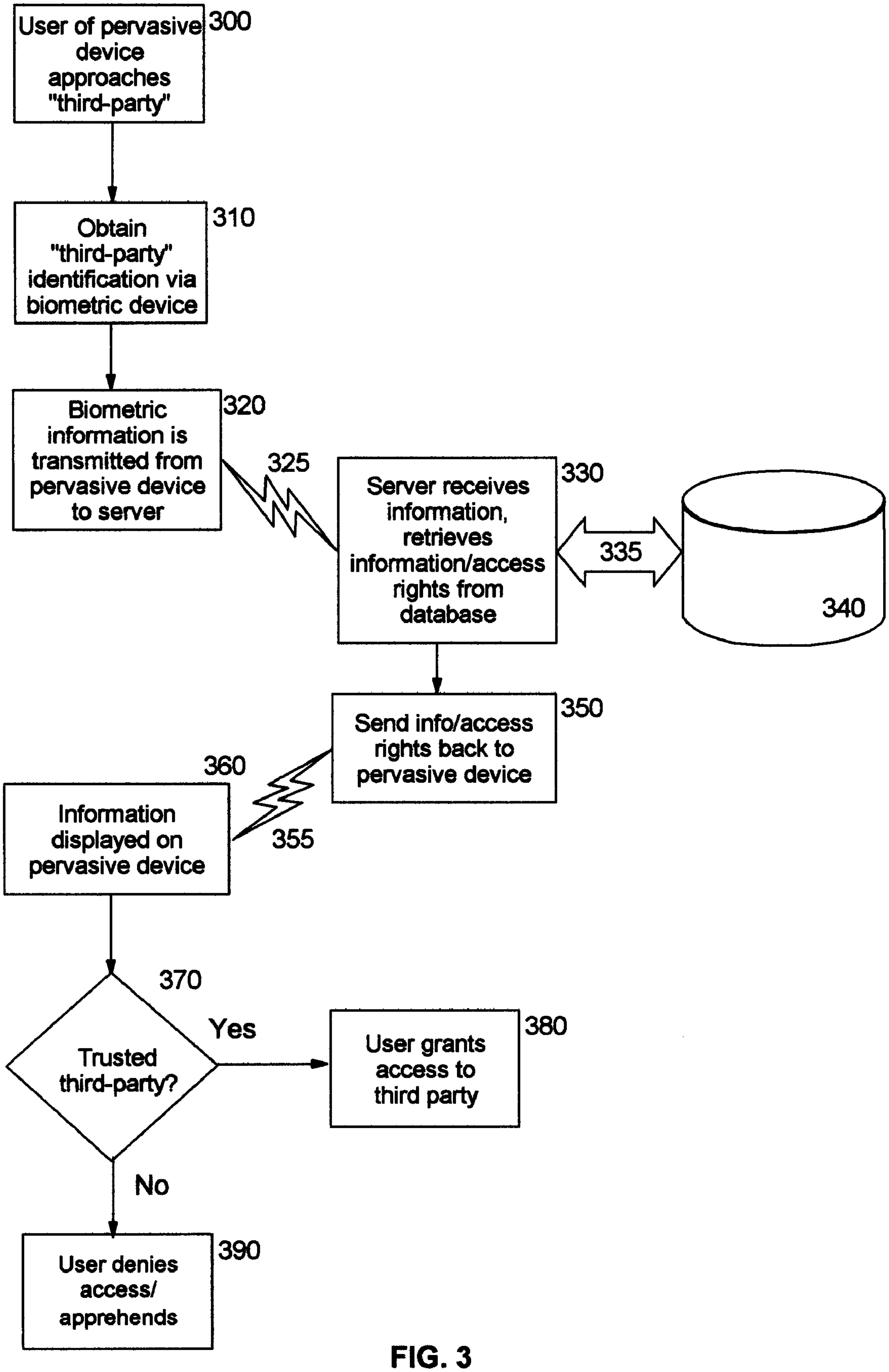
FIG. 3 illustrates the logic with which a preferred embodiment of the present invention may be implemented.

The logic of FIG. 3 begins at Block 300, where the user of the pervasive device approaches or encounters some third party of interest. This third party's biometric data is then obtained, using the biometric input device which augments the pervasive device, at Block 310. At Block 320, the biometric information is transmitted 325 from the pervasive device to a server over a wireless transmission path of some type, using the communication hardware and software which are built into the pervasive device.

The server receives the transmitted information (Block 330). Existing techniques are then used to retrieve 335 information from a data repository 340. The retrieved information depends on the application for which the biometric data is to be used, but may include such things as the third party's identification, background information on the third party, the third party's authorized access rights, or a combination of these things.

Suppose, for example, that the possessor of the pervasive device has a confidential message or package to be delivered to some person who is currently unknown to him or her. In this scenario, the retrieved information preferably includes a picture of the person to whom the biometric information corresponds, and perhaps a textual description including the date when the picture was taken, selected physical characteristics which tend to be invariant (such as height), etc. Or, in a scenario where multiple levels of access privileges are indicated, such as security-sensitive information that is available in differing degrees of detail to different receivers, the retrieved information may indicate what level of the protected information is to be divulged to this particular third party. In fact, it may be that the information which is being protected by biometric identification is not locally accessible to the possessor of the pervasive device until such time as the third party has been identified (see Block 380), in which case the information retrieved from repository 340 comprises the protected information for which this third party is being authorized through use of the present invention.

At Block 350, the server transmits 355 the information, access rights, etc. which have been obtained from repository 340 back to the pervasive device. The information (or pertinent parts thereof) is then displayed (Block 360) on the display facility of the pervasive device. For example, when the retrieved information includes a picture of the person corresponding to the captured biometric data, Block 360 preferably displays this picture. If this information indicates that the third party is to be trusted (Block 370), then access is granted (Block 380) according to the scenario in which the mobile identification is being performed. Otherwise, access for this third party is denied (Block 390). Operation of the logic of the preferred embodiment then ends with respect to this particular third party.

Note that what constitutes the test performed at Block 370 depends on the scenario in which the present invention is being used. Furthermore, this test process may be performed at the server prior to sending information back to the pervasive device in Block 350, without deviating from the inventive concepts of the present invention. This approach is preferably used when information having multiple security levels is stored at the repository 340, as has been described above, such that the information to be displayed on the pervasive device at Block 360 has been adapted or filtered as necessary prior to its transmission 355. When the verification is to be performed at the server, Block 320 may additionally comprise transmitting a purported identification (such as the text of the third party's name) of the third party along with the third party's biometric information.

Another example of advantageously using the present invention includes the law enforcement field. Thus, Block 390 indicates that one action which may be taken when the third-party verification of Block 370 has a negative result is to apprehend that third party. While the previously-described '152 and '403 patents to Fishbine describe mobile identification using fingerprints, they place a requirement for the presence of a separate unit (in addition to the device which captures the fingerprint image). That separate unit is used to receive data from the fingerprinting device, for example over a tether or by docking the fingerprint device into the separate unit. This separate unit then transmits information to a central site, and receives the response. The present invention removes the need for a separate unit, and thus greatly increases the usefulness of biometrics as a law enforcement tool: using the present invention, the officer is not required to be within proximity of a police car or other location where the separate unit would be mounted. Instead, the officer can now perform biometric analysis wherever he or she may encounter a suspect, even while working on foot patrol. Because pervasive devices are designed to be ultra-lightweight and compact, the device which enables use of the present invention will not add significantly to the bulk or weight which the officer must carry.

As another example, the present invention may be used to provide "on-demand security" of a physical site such as a meeting room. Secured physical sites are well known in the art where the security is physically built into the site itself. Typically, such sites have a biometric reader located near the door. Significant expense may be involved in setting up the physical site in this manner. The previously-discussed Hoehn-Saric '973 patent, for example, uses a biometric reader to protect access to a testing kiosk. The '973 patent describes connecting the protected kiosk to the electrical, phone, and HVAC systems of a host site, for example. Once a secured physical site has been created according to prior art techniques, it remains stationary. If a secured site is needed which is in closer proximity to meeting attendees, then a new secured site must be set up. If a previously-secured site is no longer desirable at some point in time, then the expense which went into creating the physical security may be non-recoverable. The present invention, on the other hand, enables a secure site to be created on demand, at any location where the pervasive device possessor happens to be. Upon traveling to an arbitrary meeting location, the pervasive device can be used by its possessor to reliably screen each meeting attendee. Thus the secured site may vary over time with tremendous flexibility, and has no set-up cost associated with new locations (nor wasted costs when a previously-used location is no longer needed).

As an alternative embodiment to that which has been described with reference to FIG. 3, the information needed for validating identity (or determining access rights, etc.) in a mobile environment may be locally available to the pervasive device without deviating from the inventive concepts of the present invention. For example, a storage mechanism of the pervasive device may contain pre-stored biometric identification of all authorized attendees of a particular meeting. The biometric information of each person desiring to enter a meeting location secured according to the present invention may then be captured and compared to the stored information (without requiring transmission across a network to a server).

As has been demonstrated, the present invention provides a technique for efficiently performing mobile identification using a pervasive device augmented with a biometric input device. This technique takes advantage of existing technology components, and provides a flexible, powerful solution at relatively low cost.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

The invention claimed is:

1. A computer program product for using biometrics on pervasive devices for mobile identification, said computer program product embodied on a medium readable by said pervasive device and comprising:

programmable code for capturing, using a biometric input reader which is attached to or incorporated within a mobile pervasive device possessed by a user, biometric data of another being encountered by said possessor;

programmable code for transmitting said captured biometric data from said mobile pervasive device to a remote server;

programmable code for retrieving, by said remote server, information from a repository using said transmitted biometric data, wherein said retrieved information comprises a photograph of a party to whom said biometric data corresponds;

programmable code for returning said retrieved information to said mobile pervasive device; and programmable code for identifying said encountered being using said captured biometric data by comparing said captured biometric data to previously-stored biometric data.

2. The computer program product according to claim 1, further comprising:

programmable code for filtering, by said remote server, said retrieved information based upon a determined identity of said encountered being; and wherein said returned retrieved information is said filtered retrieved information.

3. The computer program product according to claim 1, wherein said mobile pervasive device further comprises a locally-stored repository containing said previously-stored biometric data, and wherein said programmable code for identifying compares, by said mobile pervasive device, said captured biometric data to said previously-stored biometric data in said locally-stored repository.

4. The computer program product according to claim 1, wherein said computer program product is used to enable on-demand creation of a secure meeting site by repeating operation of said programmable code for capturing, said programmable code for transmitting, said programmable code for retrieving, said programmable code for returning, and said programmable code for identifying for each of a plurality of meeting attendees.

5. The computer program product according to claim 1, wherein said computer program product is used to exchange a trusted message by performing operation of said programmable code for capturing, said programmable code for transmitting, said programmable code for retrieving, said programmable code for returning, and said programmable code for identifying wherein said encountered being is a potential recipient of said trusted message.

6. A system for using biometrics on pervasive devices for mobile identification, said system comprising:

a mobile pervasive device possessed by a user;

a biometric input reader attached to or incorporated within said mobile pervasive device;

means for capturing biometric data of another being encountered by said possessor, using said biometric input reader;

means for transmitting said captured biometric data from said mobile pervasive device to a remote server;

means for retrieving, by said remote server, information from a repository using said transmitted biometric data, wherein said retrieved information comprises a photograph of a party to whom said biometric data corresponds;

means for returning said retrieved information to said mobile pervasive device; and means for identifying said encountered being using said captured biometric data by comparing said captured biometric data to previously-stored biometric data.

7. The system according to claim 6, further comprising:

means for filtering, by said remote server, said retrieved information based upon a determined identity of said encountered being; and wherein said returned retrieved information is said filtered retrieved information.

8. The system according to claim 6, wherein said mobile pervasive device further comprises a locally-stored repository containing said previously-stored biometric data, and wherein said means for identifying compares, by said mobile pervasive device, said captured biometric data to said previously-stored biometric data in said locally-stored repository.

9. The system according to claim 6, wherein said system is used to enable on-demand creation of a secure meeting site by repeating operation of said means for capturing, said means for transmitting, said means for retrieving, said means for returning, and said means for identifying for each of a plurality of meeting attendees.

10. The system according to claim 6, wherein said system is used to exchange a trusted message by performing operation of said means for capturing, said means for transmitting, said means for retrieving, said means for returning, and said means for identifying wherein said encountered being is a potential recipient of said trusted message.

* * * * *